United States Patent
Tanaka et al.

(10) Patent No.: US 7,229,197 B2
(45) Date of Patent: Jun. 12, 2007

(54) VEHICLE SIDE MIRROR APPARATUS

(75) Inventors: Yoshiharu Tanaka, Aichi-ken (JP); Akihiro Misawa, Aichi-ken (JP)

(73) Assignee: Toyoda Gosei Co., Ltd., Nishikasugai-gun, Aichi-ken (JP)

( * ) Notice: Subject to any disclaimer, the term of this patent is extended or adjusted under 35 U.S.C. 154(b) by 162 days.

(21) Appl. No.: 10/958,683

(22) Filed: Oct. 6, 2004

(65) Prior Publication Data

US 2005/0117236 A1 Jun. 2, 2005

(30) Foreign Application Priority Data

| Oct. 7, 2003 | (JP) | ............................. 2003-348459 |
| Oct. 7, 2003 | (JP) | ............................. 2003-348745 |
| Oct. 17, 2003 | (JP) | ............................. 2003-358344 |
| Jun. 28, 2004 | (JP) | ............................. 2004-190264 |
| Jun. 28, 2004 | (JP) | ............................. 2004-190265 |
| Jun. 28, 2004 | (JP) | ............................. 2004-190266 |

(51) Int. Cl.
*B60Q 1/26* (2006.01)

(52) U.S. Cl. ....................... 362/494; 362/465; 362/540; 362/487; 362/459

(58) Field of Classification Search ................ 362/494, 362/540, 465
See application file for complete search history.

(56) References Cited

U.S. PATENT DOCUMENTS

| 5,871,275 | A | * | 2/1999 | O'Farrell et al. ........... 362/494 |
| 6,099,153 | A | | 8/2000 | Zimmermann et al. |
| 6,132,072 | A | * | 10/2000 | Turnbull et al. ............. 362/494 |
| 6,257,746 | B1 | * | 7/2001 | Todd et al. .................. 362/494 |
| 6,657,767 | B2 | * | 12/2003 | Bonardi et al. ............. 359/265 |
| 6,893,146 | B2 | * | 5/2005 | Fiegler et al. ............... 362/494 |
| 7,008,089 | B1 | * | 3/2006 | McCloy et al. ............. 362/494 |
| 2003/0193815 | A1 | * | 10/2003 | Mishimagi ................... 362/522 |
| 2003/0206417 | A1 | * | 11/2003 | Pastrick et al. ............. 362/494 |

FOREIGN PATENT DOCUMENTS

| DE | 94 09 566 U1 | 6/1994 |
| DE | 198 08 139 A1 | 9/1999 |
| DE | 198 28 253 A1 | 1/2000 |
| DE | 200 20 544 U1 | 3/2001 |
| DE | 202 20 246 U1 | 8/2002 |
| DE | 102 38 073 A1 | 3/2004 |

* cited by examiner

*Primary Examiner*—Renee Luebke
*Assistant Examiner*—Mary Zettl
(74) *Attorney, Agent, or Firm*—McGinn IP Law Group, PLLC

(57) ABSTRACT

A vehicle side mirror apparatus for looking backward circumstances of a vehicle has: a housing that is of a transparent or semitransparent material with a cross section having a predetermined thickness, the housing having a light entering end into which light enters, and a light radiating end that faces the back of the vehicle; and an LED lamp that is disposed in the vicinity of the light entering end. Light emitted from the LED lamp enters into the light entering end of the housing, passing through within the cross section, being radiated to the back of the vehicle from the light radiating end of the housing.

10 Claims, 11 Drawing Sheets

1 SIDE MIRROR APPARATUS
2 HOUSING
2a COATED REGION
7 LED LAMP
5 BRACKET
101 DOOR

2c LIGHT RADIATING END
3 OPENING
4 MIRROR
6 INNER COVER

VEHICLE SIDE MIRROR APPARATUS

The present application is based on Japanese patent application Nos. 2003-348459, 2003-348745, 2003-358344, 2004-190264, 2004-190265 and 2004-190266, the entire contents of which are incorporated herein by reference.

BACKGROUND OF THE INVENTION

1. Field of the Invention

The invention relates to a vehicle side mirror apparatus disposed at a predetermined position of a vehicle such as a four-wheeled vehicle (hereinafter referred to as automobile) and a motorcycle, and particularly to a vehicle side mirror apparatus that has an improved visibility from behind the vehicle while having a simple structure.

2. Description of the Related Art

Vehicles such as automobiles and motorcycles are equipped with a side mirror apparatus that allows its driver to look backward circumstances. For example, in case of automobile, side mirror apparatuses are disposed on both sides of its front window or bonnet while projecting from the car width. Although the side mirror apparatus is attached projecting from the car width, it is not easy for a driver of oncoming car or a pedestrian to notice it in the night since it is relatively small. Therefore, a driver of oncoming car, pedestrian or bicycle rider may have a minor collision with the side mirror apparatus Especially, a black side mirror apparatus must produce a worse visibility even when the body color is white or so.

U.S. Pat. No. 6,099,153 discloses an exterior rearview mirror for vehicles that allows its recognition at night to prevent the minor collision. The exterior rearview mirror, which corresponds to the side mirror apparatus, is structured such that a light source is mounted in a housing, the housing has an outlet opening though which light emitted by the light source exists the housing, and a light guide at least partially fills the outlet opening and is connected within the interior of the housing to the light source.

However, the conventional side mirror apparatus has problems as described below.

Although light emitted from the light guide can be recognized by a person ahead of the vehicle, it cannot be recognized by a person behind the vehicle. Thus, it is difficult for a car driver, pedestrian or bicycle rider who passes by the vehicle from behind the vehicle to recognize the side mirror apparatus. Therefore, the minor collision to the side mirror apparatus may occur. Further, since the light guide is partially provided in the outlet opening, its emission area is narrow and therefore it is not easy to recognize. Further, since an attachment member is needed to attach the light guide, the structure thereof is complicated.

SUMMARY OF THE INVENTION

It is an object of the invention to provide a vehicle side mirror apparatus that has an improved visibility from behind the vehicle while having a simple structure.

According to the invention, a vehicle side mirror apparatus for looking backward circumstances of a vehicle comprises:

a housing that is of a transparent or semitransparent material with a cross section having a predetermined thickness, the housing comprising a light entering end into which light enters, and a light radiating end that faces the back of the vehicle; and an LED lamp that is disposed in the vicinity of the light entering end, wherein light emitted from the LED lamp enters into the light entering end of the housing, passing through within the cross section, being radiated to the back of the vehicle from the light radiating end of the housing.

In the vehicle side mirror apparatus of the invention, the housing is provided with a light radiating end that radiates light to the back of vehicle and, thereby, the radiated light can be recognized by a person behind the vehicle.

Further, since the housing itself serves as a light guide, a separate component for the light guide is not needed and an attachment for the light guide is not needed Therefore, the number of components can be reduced and the apparatus can have a simple structure.

Further, due to the large light radiation region of housing, the visibility can be enhanced

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Figure 1A:
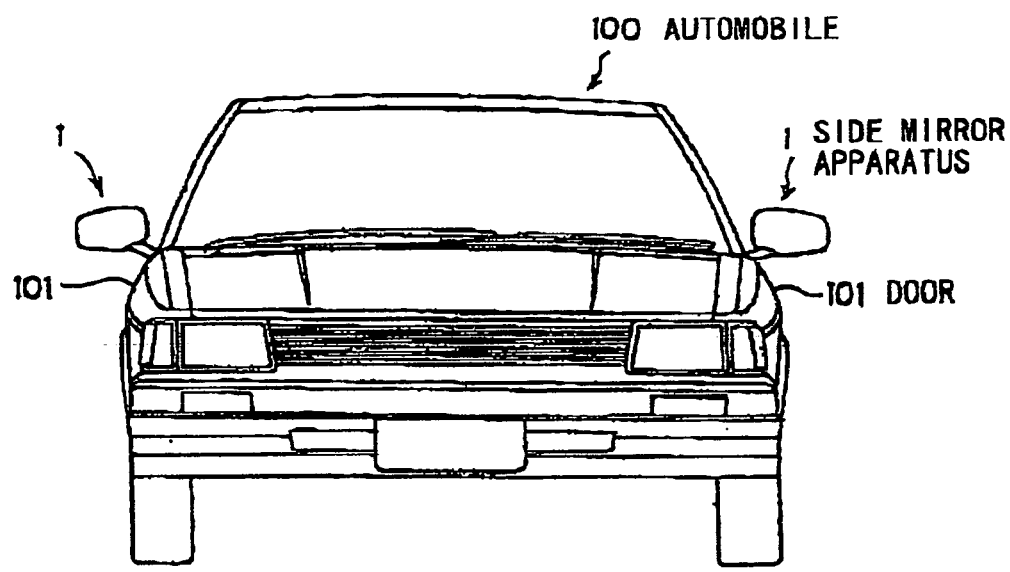
FIG. 1A is a front view showing an automobile with a vehicle side mirror apparatus in a preferred embodiment according to the invention.
Figure 1B:
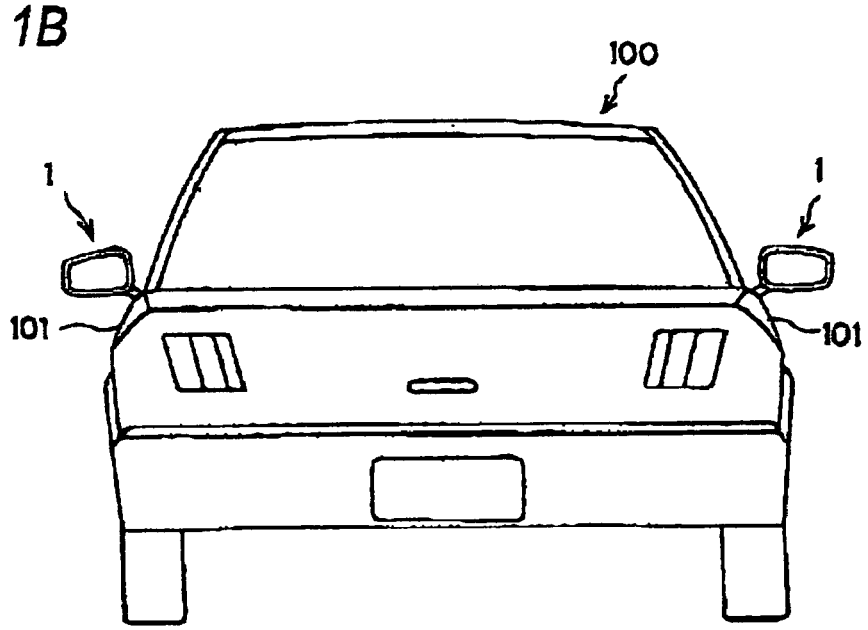
FIG. 1B is a rear view showing the automobile in FIG. 1A.

FIG. 1A is a front view showing an automobile with a vehicle side mirror apparatus in the preferred embodiment according to the invention. FIG. 1B is a rear view showing the automobile in FIG. 1A. As shown, the vehicle side mirror apparatus 1 is attached to right and left front doors 101 of the automobile 100.

Figure 2A:
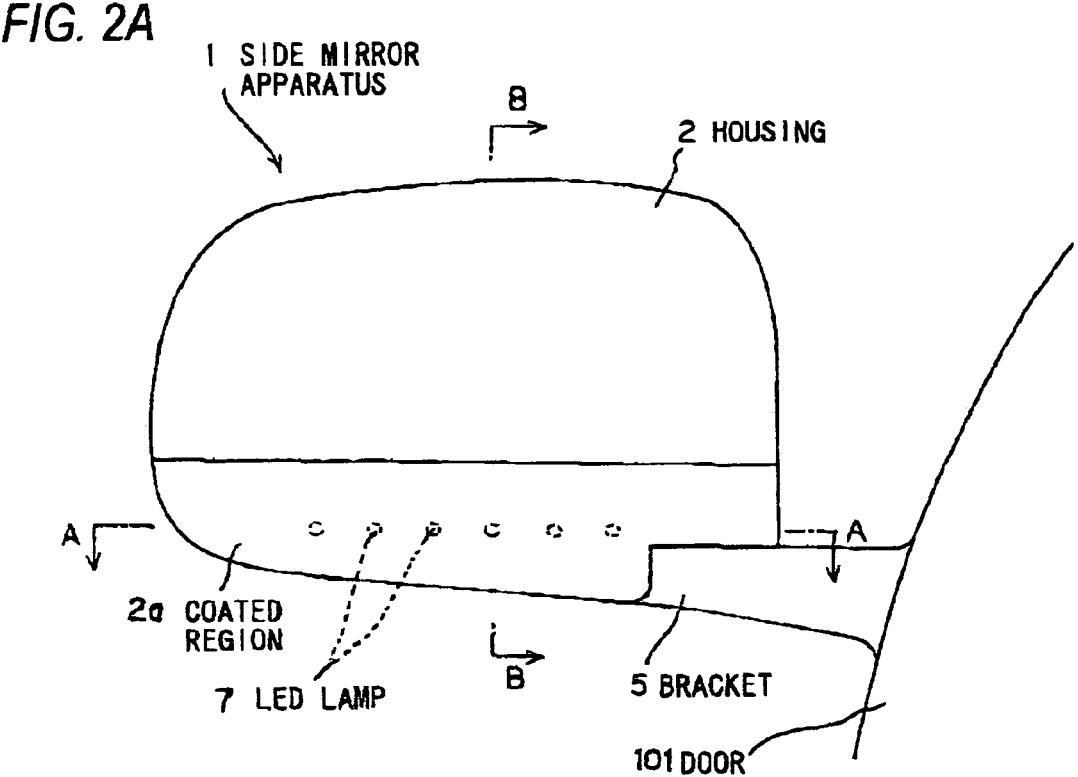
FIG. 2A is a front view showing the vehicle side mirror apparatus 1 in FIG. 1A.
Figure 2B:
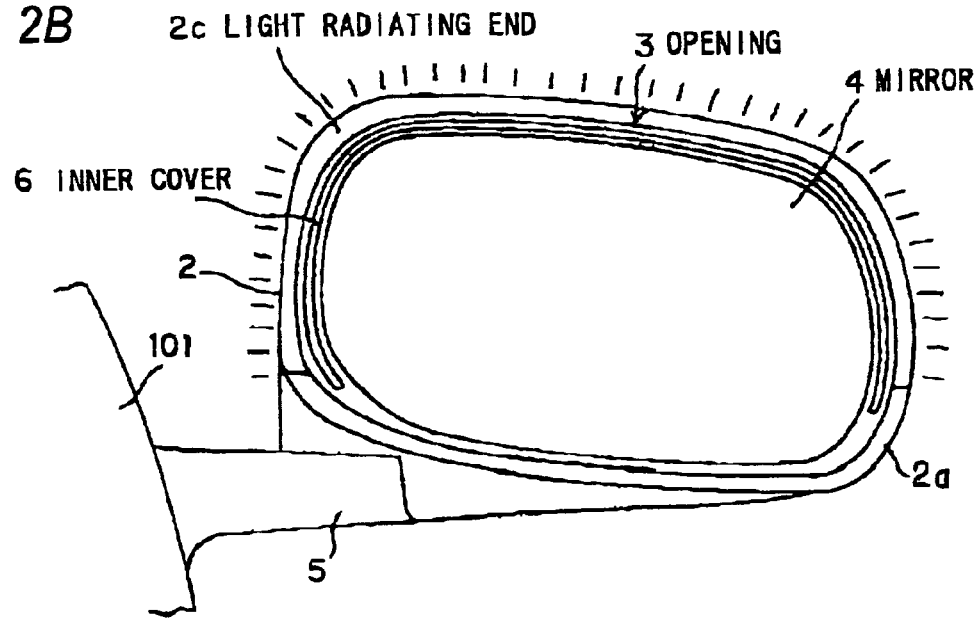
FIG. 2B is a rear view showing the vehicle side mirror apparatus in FIG. 2A.

FIG. 2A is a front view showing the vehicle side mirror apparatus 1 in FIG. 1A. FIG. 2B is a rear view showing the vehicle side mirror apparatus in FIG. 2A.

The vehicle side mirror apparatus 1 is composed of: a hollow housing 2 that has an opening 3 on the rear side; a mirror 4 that is disposed to close up the opening 3 and allows a driver of the automobile 100 to look backward circumstances; a mirror bracket 5 that connects the housing 2 through a corner bracket (not shown) to the door 101; an inner cover 6 that is disposed inside of the housing 2 while having a predetermined clearance; a circuit board 8 that has a plurality of LED lamps 7A such that they are received in the thickness of housing 2; a mirror tilting mechanism (not shown) that allows the mirror 4 to be tilted by a remote control; and a housing rotating mechanism (not shown) that allows the housing 2 to be rotated by a remote control.

First Embodiment

Figure 3A:
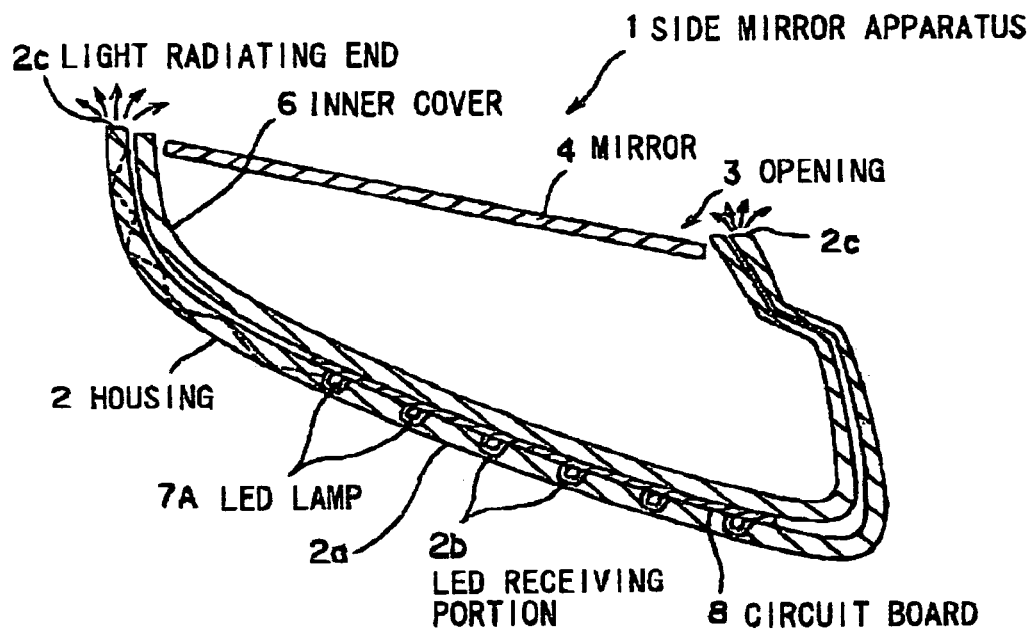
FIG. 3A is a cross sectional view showing a vehicle side mirror apparatus, which is cut along a line A—A in FIG. 2A, in a first preferred embodiment according to the invention.
Figure 3B:
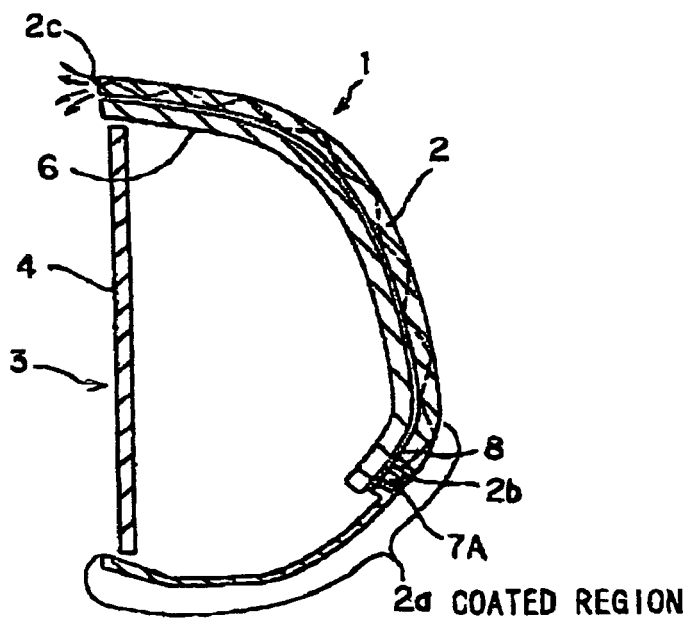
FIG. 3B is a cross sectional view showing the vehicle side mirror apparatus in FIG. 3A which is cut along a line B—B in FIG. 2A.

FIG. 3A is a cross sectional view showing a vehicle side mirror apparatus, which is cut along a line A—A in FIG. 2A, in the first preferred embodiment according to the invention. FIG. 3B is a cross sectional view showing the vehicle side mirror apparatus in FIG. 3A which is cut along a line B—B in FIG. 2A.

The housing 2 is of colorless and transparent or semi-transparent resin such as acrylic resin and polycarbonate resin, which has weather resistance, shock resistance and transparency, and is molded to have a predetermined thickness. It is provided with a plurality of concave LED receiving portions 2b the surrounding surface of which allows the incidence of light emitted from the LED lamp 7A, and with a light radiating end 2c that defines the opening 3 and allows the external radiation of light emitted from the LED lamp 7A and propagated through the inside of housing 2. The light radiating end 2c is diffusion-finished such as surface roughening to offer a diffusion property to light radiated from the light radiating end 2c.

Figure 7A:
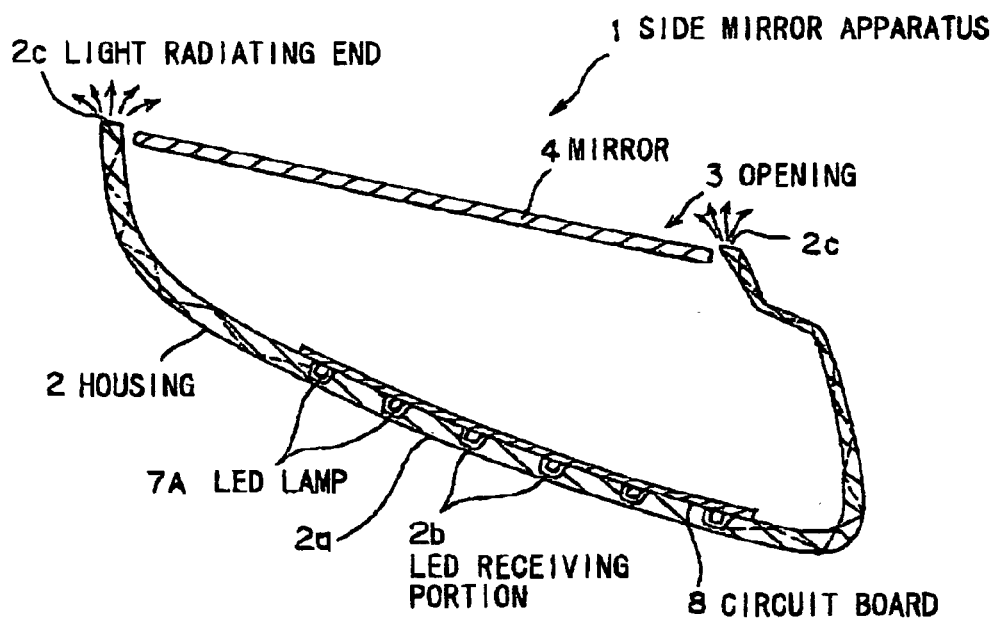
FIG. 7A is a cross sectional view showing a vehicle side mirror apparatus, which is cut along the line A—A in FIG. 2A, in a third preferred embodiment according to the invention.
Figure 7B:
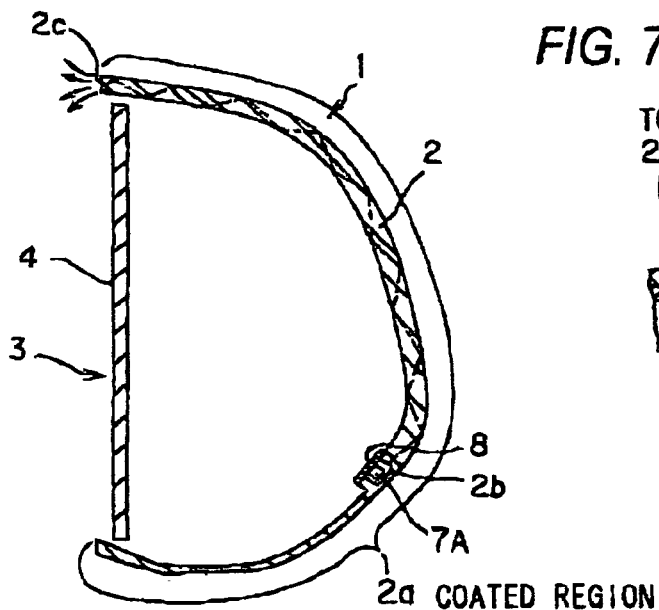
FIG. 7B is a cross sectional view shoving the vehicle side mirror apparatus in FIG. 7A which is cut along the line B—B in FIG. 2A.
Figure 7C:
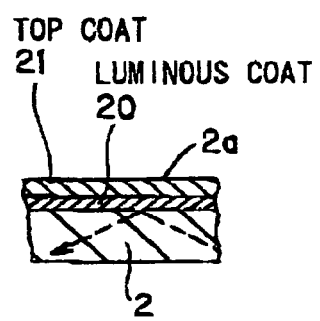
FIG. 7C is an enlarged cross sectional view showing part of a coated region 2a in FIG. 7B.

Further, the housing 2 is on the outer surface provided with a lower coated region 2a that, as shown in FIG. 7C, a luminous coat 20 in white etc. is formed as a reflection layer. On the luminous coat 20, a top coat 21 is formed that has a different color from the luminous coat 20 by using, for example, a paint of the same color as the automobile body. Optionally, the housing 2 may have an uneven outer surface that allows the modification of diffused light leaking from the surface of housing 2.

The inner cover 6 is of a resin such as acrylic resin and polycarbonate resin which has weather resistance and has an outer surface coated with a paint of the same color as the automobile body. Alternatively, the outer surface may be coated with a paint of a different color from the automobile body. It is preferable that the inner cover 6 is fixed to a portion in the lower coated region 2a while offering the clearance between the inner cover 6 and the housing 2. Further, it is preferable that the inner cover 6 is matte-finished so as not to prevent the light propagation in the housing 2. However, it may be gloss-finished.

The LED lamp 7A emits light in, for example, amber (orange) series color. The amber series light finally needed may be obtained by combining the emission color of LED lamp 7A and the material color of housing 2. For example, the combination can be the LED lamp 7A to emit whitish light and the housing 2 of a transparent or semitransparent material in amber series color, or the LED lamp 7A to emit amber series light and the housing 2 of a transparent or semitransparent material in amber series color. The LED lamp 7A may emit light in a color other than amber series color according to use.

The circuit board 8 is composed such that a wiring pattern electrically connected to the LED lamp 7A is formed on a board that is of polyimide resin, silicone resin etc. with heat resistance. The wiring pattern is connected to a wire harness that wires a fuse box, distributor or switch disposed in the automobile 100. The circuit board 8 may be divided into multiple boards which are electrically connected each other. In this case, the degree of freedom in arrangement thereof can be increased. The circuit board 8 may have a drive circuit mounted thereon to drive the LED lamp 7A in a predetermined pattern such as turning on and off. Thereby, the circuit composition on the automobile body side can be simplified.

Figure 4:
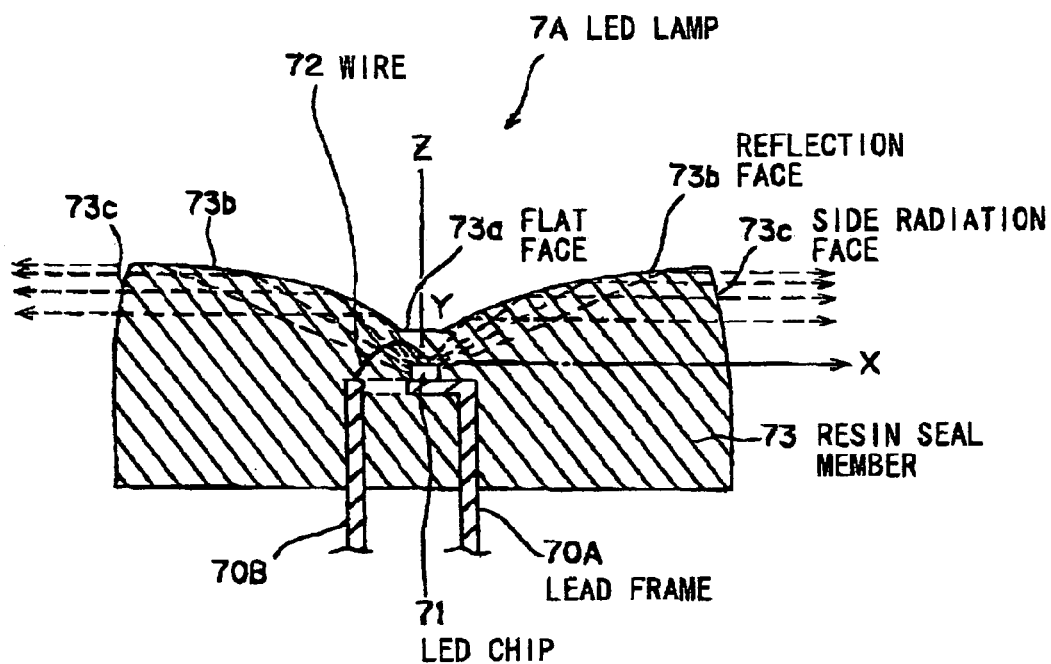
FIG. 4 is a cross sectional view showing an LED lamp used in the vehicle side mirror apparatus of the first embodiment.

FIG. 4 is a cross sectional view showing an LED lamp used in the vehicle side mirror apparatus of the first embodiment. The LED lamp 7A is composed of: a pair of lead frames 70A, 70B that are of metal such as copper alloy and aluminum alloy with a good heat conductivity and disposed through a gap for insulation on X-Y plane; an LED chip 71 that is mounted on the of one lead frame 70A that is bent into L-shape; a wire 72 that electrically connects the top-face electrode of LED chip 71 to the top portion of another lead frame 70B; and a resin seal member 73 that is of transparent epoxy resin etc., and allows the horizontal directivity of light emitted from the LED chip 71 while sealing part of the lead frames 70A, 70B. LED chip 71 and wire 72.

The resin seal member 73 is as a whole formed nearly into a flat cylinder, and is composed of; a flat face 73i a l that is provided directly over the LED chip 71; a reflection face 73b that is formed like an arc continuously extending from the flat face 73a; and a side radiation face 73c that downward extends from the end of reflection face 73b. The reflection face 73b is shaped like an umbrella by rotating part of a parabola, which has a focal point at the center of emission surface of LED chip 71 and is symmetrical to X-axis, around Z-axis in a range of within 60 or more degrees from Z-axis.

In operation, when power is supplied to the LED lamp 7A through the wire harness and the wiring pattern on the circuit board 8 in synchronization with the turn-on of a winker lamp (turn lamp), parking lamp or keyless entry system (a system to lock or unlock the door by remote control) the LED chip 71 emits light. Of light emitted from the LED chip 71, a light component radiated along the center axis (Z) of LED chip 71 is externally radiated directly without being reflected on the flat face 73a of resin seal member 73. A light component heading to the reflection face 73b is reflected on the reflection face 73b and heads to directions of 360 degrees around and perpendicular to the center axis of LED chip 71. Thus, the light enters into the surrounding surface of LED receiving portion 2b and, as shown in FIGS. 3A and 3B, passes through within the thickness of housing 2 to the light radiating end 2c while being reflected, and, as shown in FIGS. 2B, 3A and 3B, is radiated backward from the light radiating end 2c. At that time, when light emitted from the LED lamp 7A passes through within the thickness of housing 2, part of the light leaks as diffused light from the surface of housing 2 and thereby even the upper surface with no coat illuminates light.

The vehicle side mirror apparatus 1 of the first embodiment has the following effects.

(i) Since the light radiating end 2c on the periphery of the mirror 4 radiates light, the visibility from behind the vehicle can be enhanced. In addition, when light emitted from the LED lamp 7A passes through within the thickness of housing 2, part of the light leaks from the outer surface other than the coated region 2a of housing 2 and can be recognized by a person ahead of the vehicle. Further, due to the large light radiation region of housing 2, the visibility can be enhanced (ii) With the planar radiation type of LED lamp 7A, light radiated from the LED lamp 7A can be effectively introduced into the thickness of housing 2. Therefore, the number of light sources can be reduced, the power consumption can be reduced, and the overheat of housing 2 can be prevented. Further, the light radiating end 2c can be uniformly illuminated.

(iii) Since the housing 2 itself serves as a light guide, a separate component for the light guide is not needed and an attachment for the light guide is not needed. Therefore, the number of components can be reduced and the apparatus can have a simple structure.

(iv) Since the inner cover 6 is disposed to offer a clearance to inside of the housing 2, it does not prevent the light propagation in the housing 2. Therefore, light radiated from the LED lamp 7A can be efficiently propagated to the light radiating end 2c.

(v) With the coated region 2a provided on the outer surface of housing 2, the LED lamp 7A is shaded. Therefore, the apparatus can have an esthetic appearance.

The LED lamp 7A may be integrated with the housing 2 by filling a seal member such as transparent resin with a refractive index equal to that of the housing 2 into a gap between the LED lamp 7A and the LED receiving portion 2b so as to prevent a reduction in light incidence efficiency to the housing 2. Thereby, the interface reflection to cause a reduction in radiated light can be suppressed.

Second Embodiment

Figure 5A:
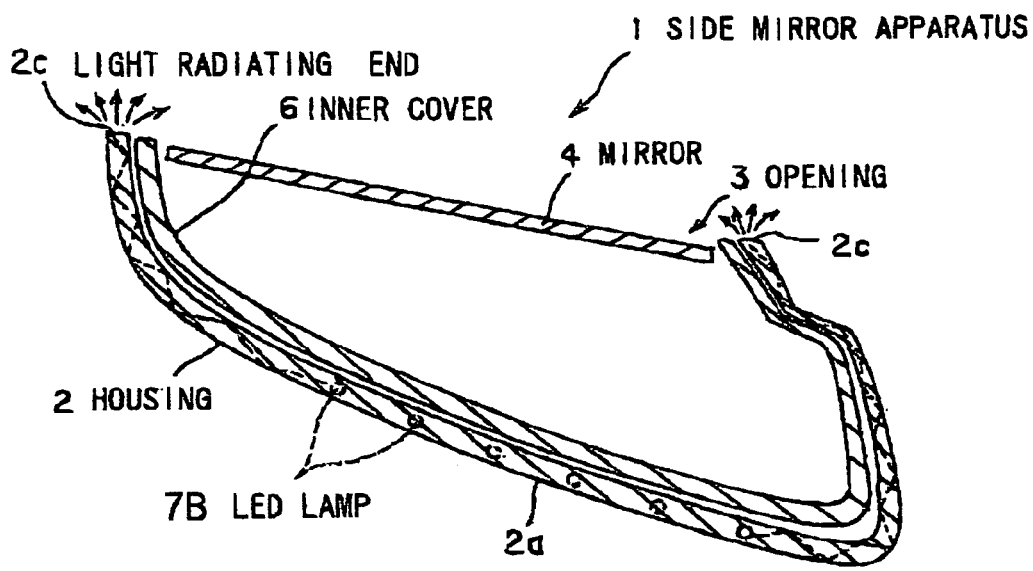
FIG. 5A is a cross sectional view showing a vehicle side mirror apparatus, which is cut along the line A—A in FIG. 2A, in a second preferred embodiment according to the invention.
Figure 5B:
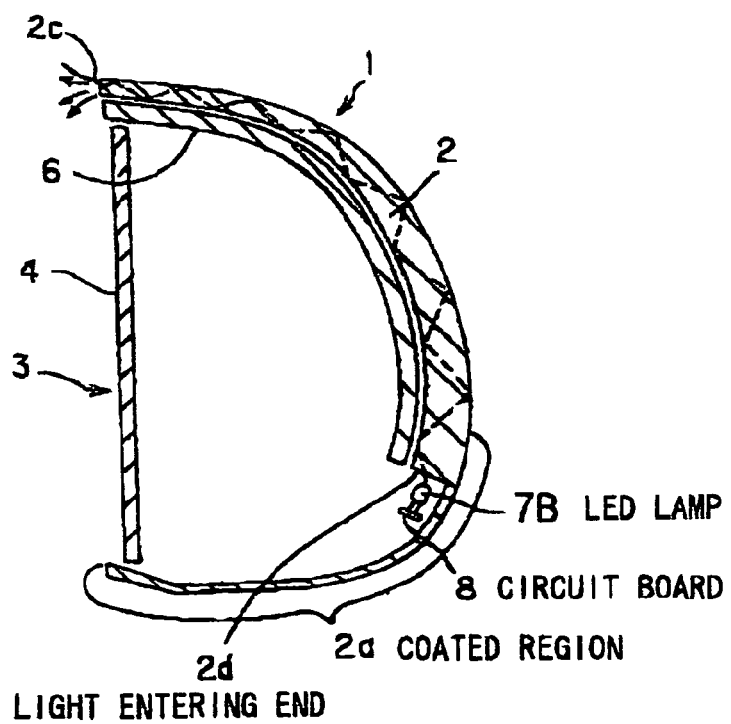
FIG. 5B is a cross sectional view showing the vehicle side mirror apparatus in FIG. 5A which is cut along the line B—B in FIG. 2A.

FIG. 5A is a cross sectional view showing a vehicle side mirror apparatus, which is cut along the line A—A in FIG. 2A, in the second preferred embodiment according to the invention. FIG. 5B is a cross sectional view showing the vehicle side mirror apparatus in FIG. 5A which is cut along the line B—B in FIG. 2A.

The vehicle side mirror apparatus of the second embodiment is different from that of the first embodiment in that a lamp type LED lamp 7B is used instead of the planar radiation type LED lamp 7A, and a light entering end 2d to introduce light emitted from the LED lamp 7B is formed by making a step portion between the thick portion and thin portion of the housing 2.

Figure 6:
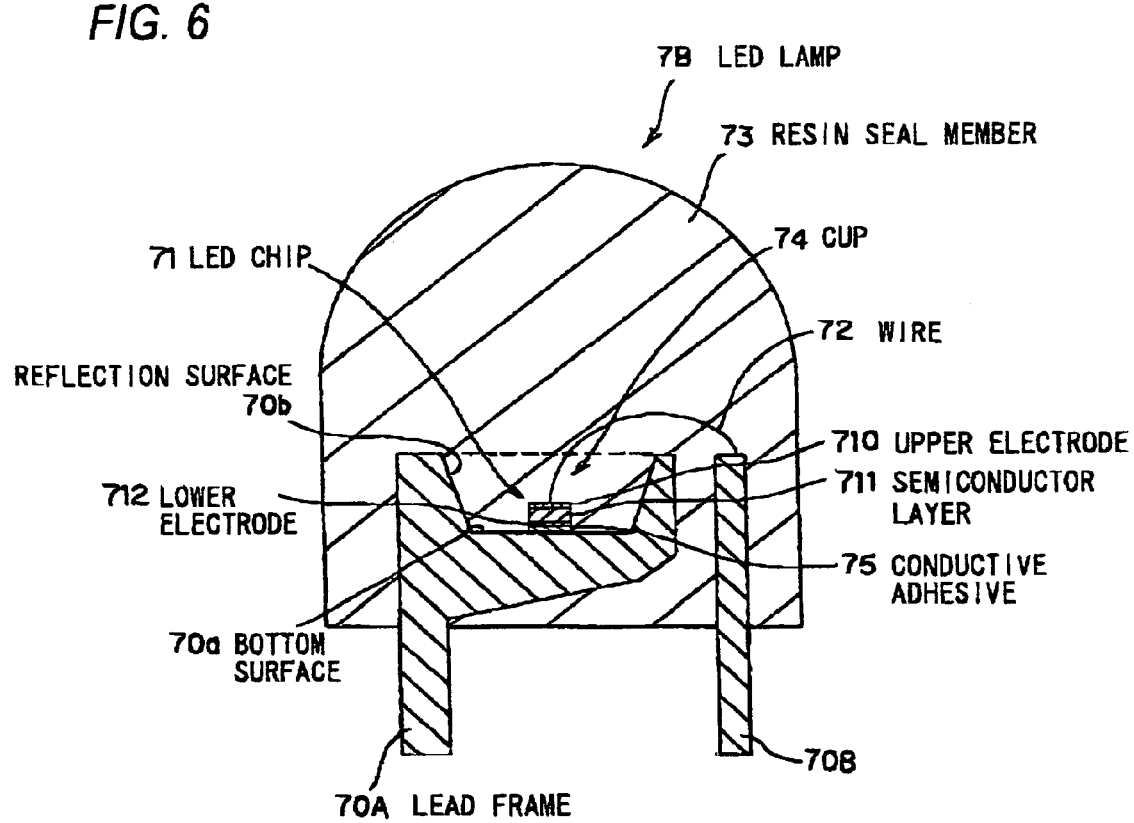
FIG. 6 is a cross sectional view showing an LED lamp used in the vehicle side mirror apparatus of the second embodiment.

FIG. 6 is a cross sectional view showing the LED lamp 7B used in the vehicle side mirror apparatus of the second embodiment.

The LED lamp 7B as another ornamental LED lamp is composed of: a pair of lead frames 70A, 70B; a cup 74 that is provided on the top of one lead frame 70A and has a reflection surface 70b on the surrounding wall: a GaAs-based LED chip 71 that is bonded through a conductive adhesive 75 such as Ag paste to the bottom of the cup 74 and has electrodes disposed vertically; a wire 72 that electrically connects an upper electrode 710 to the other lead frame 70B; a lamp-shaped resin seal member 73 that is transparent to the emission wavelength of LED chip 71 and seals part of the lead frames 70A, 70B, LED chip 71 and wire 72 and offer a directivity in the center axis direction to light emitted from the LED chip 71. The LED chip 71 is composed of the upper electrode 710, semiconductor layers 711 of GaAs based semiconductor material, and a lower electrode 712 disposed under the semiconductor layers 711.

The LED chip 71 may be composed of GaAs based crystal such as GaAsP and GaAlAs or GaP based crystal. For example, by using GaAsP, light from infrared to yellow-green can be emitted, and by using GaAlAs, red light can be emitted. By using GaP, light in green, yellow-green, red, blue, white etc. can be emitted. Other than light color in red or amber, white light can be obtained by using an LED chip of GaN based semiconductors.

In the second embodiment, like the first embodiment, since the light radiating end 2c on the periphery of the mirror 4 radiates light, the visibility from behind the vehicle can be enhanced. Since the inner cover 6 is disposed to offer a clearance to inside of the housing 2, light radiated from the LED lamp 7B can be efficiently propagated to the light radiating end 2c. Further, by using the GaAs based or GaP based LED chip 71, the vehicle side mirror apparatus can have an emission color according to the desire of its user, or can have an ornamental property as compared to amber color used in general.

The lamp-shaped (round-topped) LED lamp 7B may have a top formed planar and the planar top can be closely fitted to the light entering end 2d. Alternatively, without forming the top of lamp-shaped LED lamp 7B into the planar shape, the light entering end 2d may be formed concave to be closely fitted to the round top of the LED lamp 7B. Thereby, the interface reflection to cause a reduction in radiated light can be suppressed.

Third Embodiment

FIG. 7A is a cross sectional view showing a vehicle side mirror apparatus, which is cut along the line A—A in FIG. 2A, in the third preferred embodiment according to the invention. FIG. 7B is a cross sectional view showing the vehicle side mirror apparatus in FIG. 7A which is cut along the line B—B in FIG. 2A. FIG. 7C is an enlarged cross sectional view showing part of a coated region 2a in FIG. 7B.

The vehicle side mirror apparatus of the third embodiment is different from that of the first embodiment in that the inner cover 6 is not provided inside the housing 2 and, instead of this, the coated region 2a is formed all on the outer surface of housing 2.

The coated region 2a formed all on the outer surface of housing 2 is as shown in FIG. 7C, provided with a luminous coat 20 in white etc. is formed as a reflection layer. On the luminous coat 20, a top coat 31 is formed that has a different color from the luminous coat 20 by using, for example, a paint of the same color as the automobile body. Optionally, the housing 2 may have an uneven outer surface that allows the modification of diffused light leaking from the surface of housing 2.

Figure 8A:
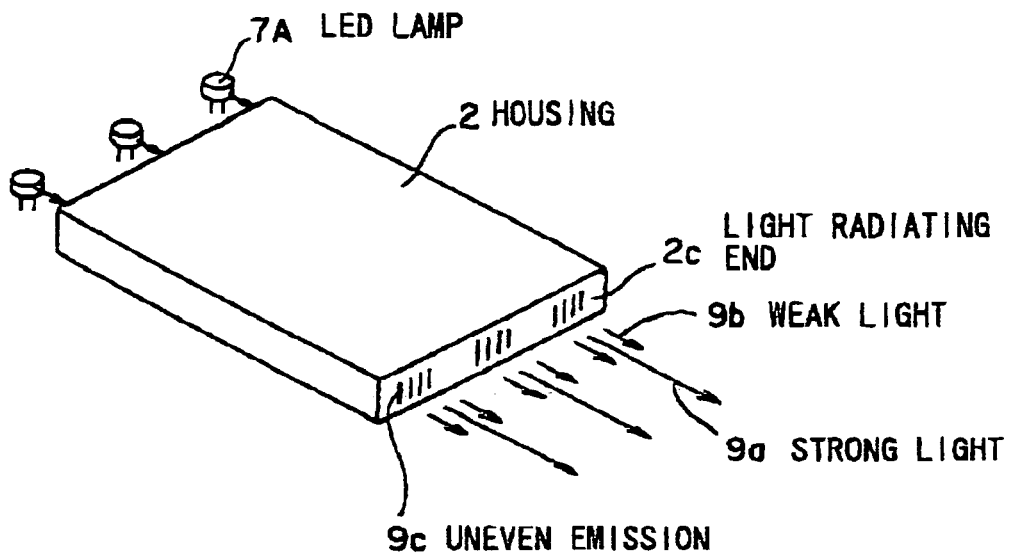
FIG. 8A is an illustration showing the case that a luminous coat 20 is not formed on the surface of housing 2.
Figure 8B:
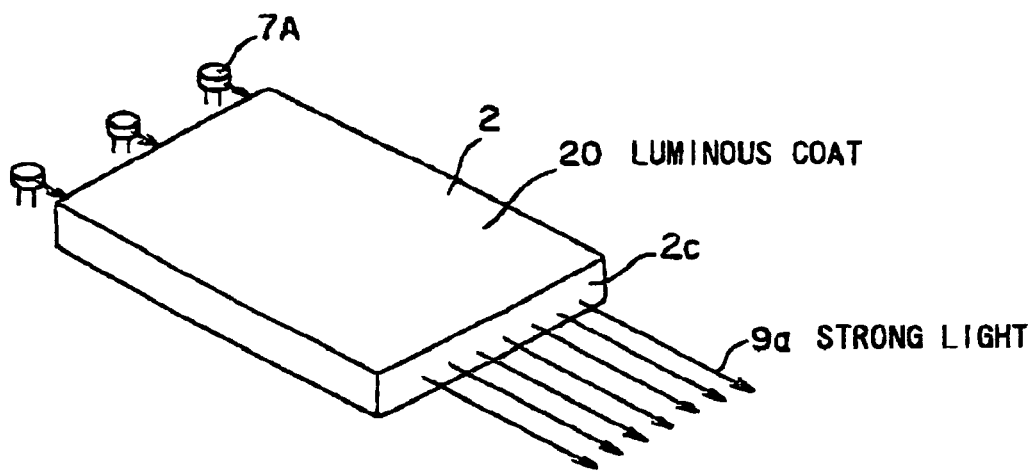
FIG. 8B is an illustration showing the case that the luminous coat 20 is not formed on the surface of housing 2.

FIGS. 8A–8B illustrate the effects of the third embodiment. FIG. 8A is an illustration showing the case that the luminous coat 20 is not formed on the surface of housing 2.

FIG. 8B is an illustration showing the case that the luminous coat 20 is not formed on the surface of housing 2.

As shown in FIG. 8A, in the case that the luminous coat 20 is not formed on the surface of housing 2, unevenness 9c in emitted light at the light radiating end 2c may occur due to strong light 9a and weak light 9b generated at the light radiating end 2c. In contrast, as shown in FIG. 8B, in the case that, as in this embodiment, the luminous coat 20 is not formed on the surface of housing 2, the light radiating end 2c can uniformly radiate light since strong light 9a is evenly generated at the light radiating end 2c.

In the third embodiment, like the first embodiment, since the light radiating end 2c on the periphery of the mirror 4 radiates light, the visibility from behind the vehicle can be enhanced. Further, since the LED lamp 7A is shaded with the coated region 2a provided all on the outer surface of housing 2, the apparatus can have an esthetic appearance.

Fourth Embodiment

Figure 9:
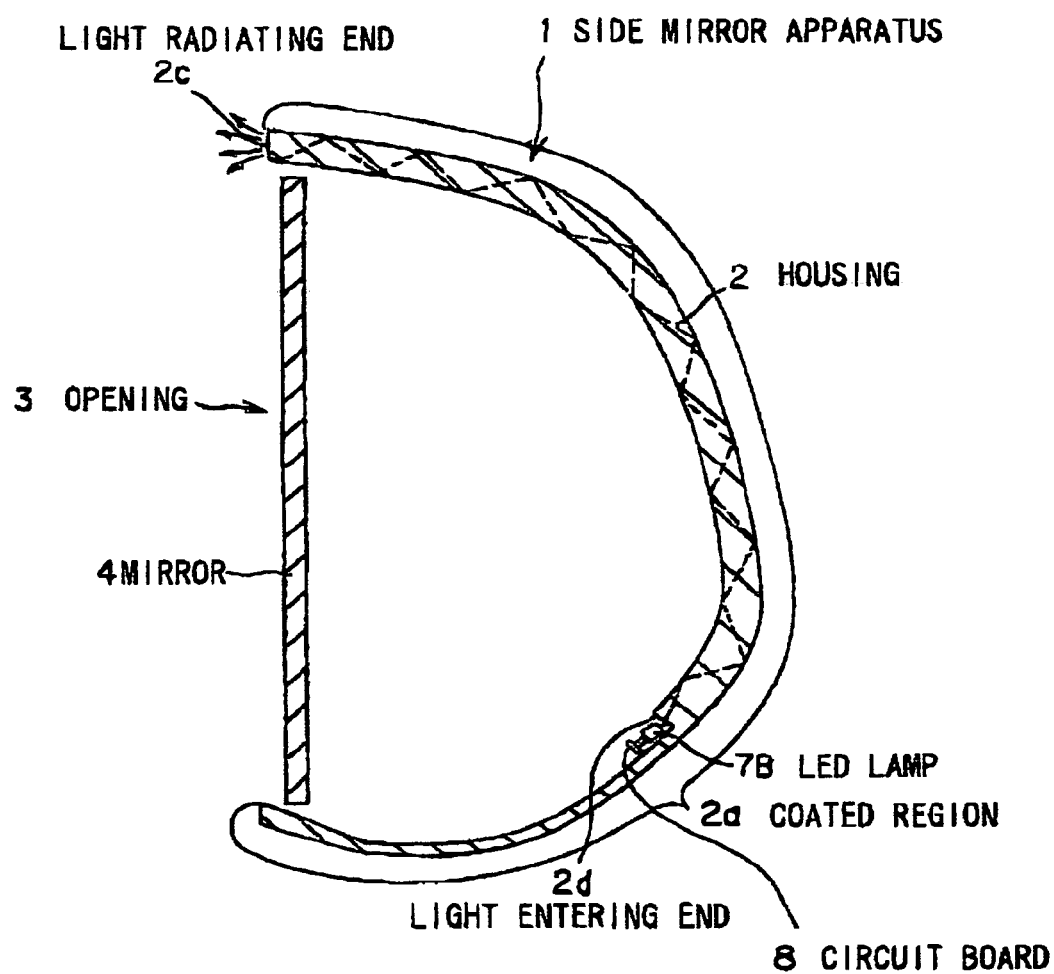
FIG. 9 is a cross sectional view showing a vehicle side mirror apparatus in a fourth preferred embodiment according to the invention.

FIG. 9 is a cross sectional view showing a vehicle side mirror apparatus in the fourth preferred embodiment according to the invention.

The vehicle side mirror apparatus of the fourth embodiment is different from that of the third embodiment in that the lamp type LED lamp 7B is used instead of the planar radiation type LED lamp 7A, and the light entering end 2d to introduce light emitted from the LED lamp 7B is formed by making a step portion between the thick portion and thin portion of the housing 2.

In the fourth embodiment, like the third embodiment, since the light radiating end 2c on the periphery of the mirror 4 radiates light and the luminous coat 20 is formed all on the outer surface of housing 2, the visibility from behind the vehicle can be further enhanced. Further, by using the GaAs based or GaP based LED chip 71, the vehicle side mirror apparatus can have an emission color according to the desire of its user, or can have an ornamental property as compared to amber color used in general.

The lamp-shaped (round-topped) LED lamp 7B may have a top formed planar and the planar top can be closely fitted to the light entering end 2d. Alternatively, without forming the top of lamp-shaped LED lamp 7B into the planar shape, the light is entering end 2d may be formed concave to be closely fitted to the round top of the LED lamp 7B. Thereby, the interface reflection to cause a reduction in radiated light can be suppressed.

Fifth Embodiment

Figure 10:
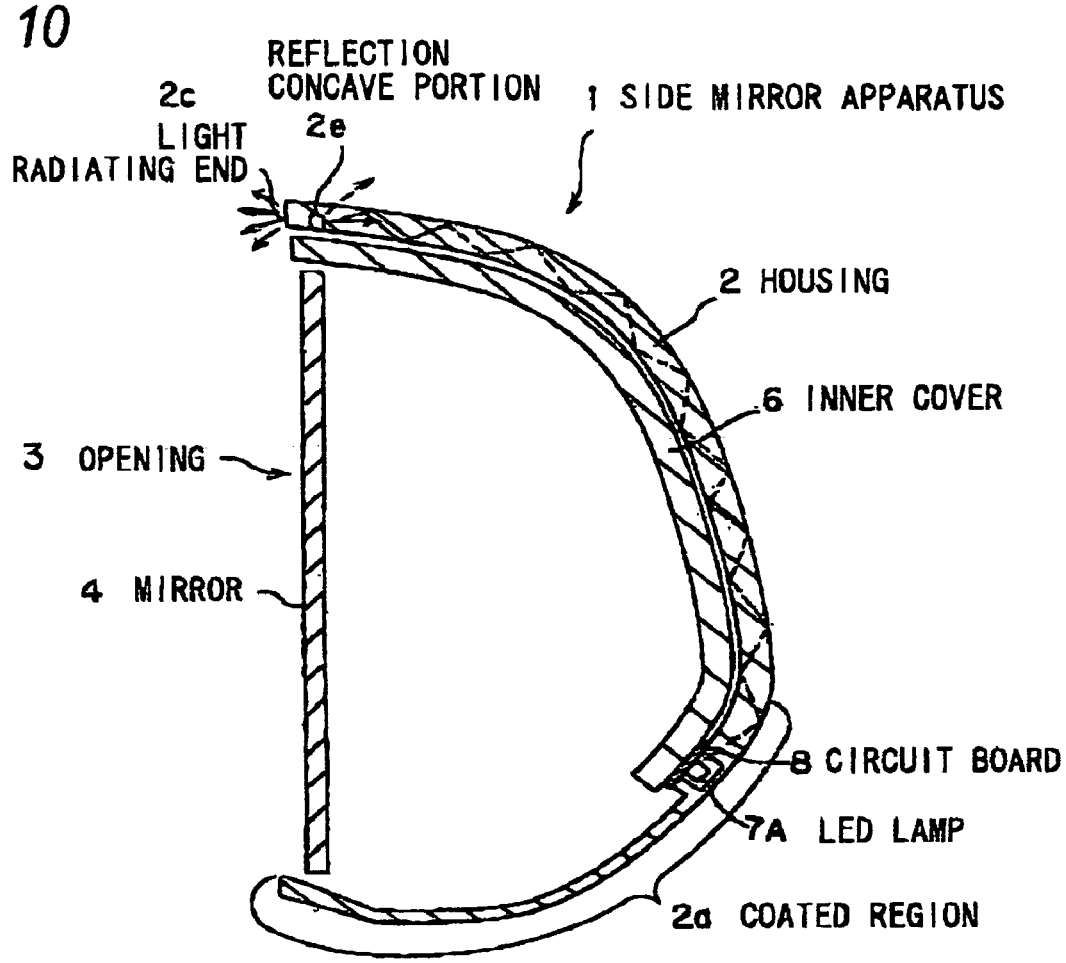
FIG. 10 is a cross sectional view showing a vehicle side mirror apparatus in a fifth preferred embodiment according to the invention.

FIG. 10 is a cross sectional view showing a vehicle side mirror apparatus in the fifth preferred embodiment according to the invention.

The vehicle side mirror apparatus 1 of this embodiment includes a reflection concave portion 2e that is formed near the light radiating end 2c of housing 2 in the first embodiment such that light emitted from the LED lamp 7A can be also radiated forward due to reflection at the reflection concave portion 2e.

In the fifth embodiment, light emitted from the LED lamp 7A can be recognized by a person not only behind the vehicle but also ahead of the vehicle. Meanwhile, the reflection concave portion 2e may be a through-hole such as a slit.

Sixth Embodiment

Figure 11:
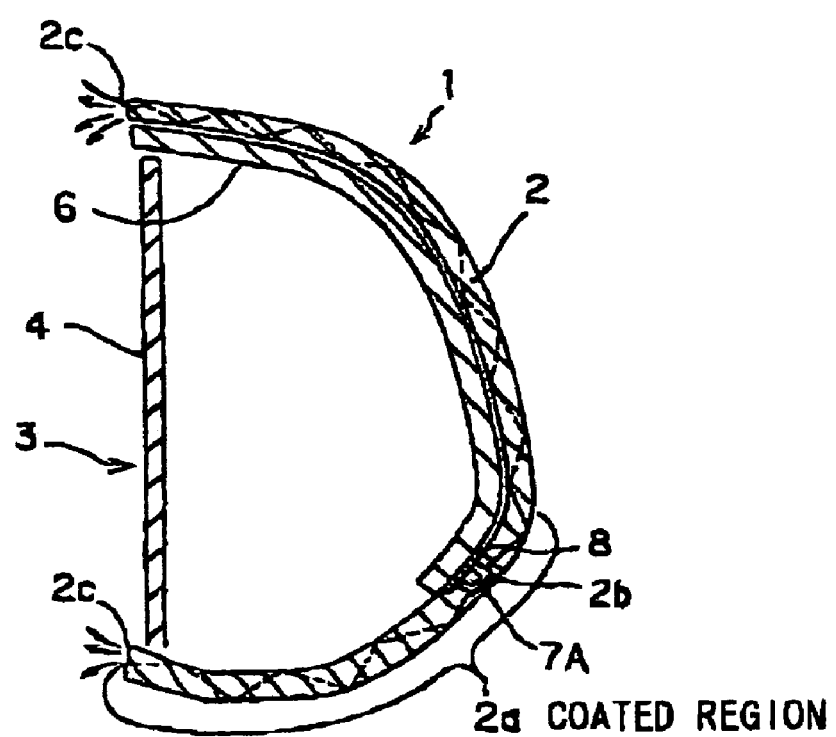
FIG. 11 is a cross sectional view showing a vehicle side mirror apparatus in a sixth preferred embodiment according to the invention.

FIG. 11 is a cross sectional view showing a vehicle side mirror apparatus in the sixth preferred embodiment according to the invention.

The vehicle side mirror apparatus 1 of this embodiment also includes the light radiating end 2c such that light can be guided to the lower side of housing 2 of the first embodiment Thereby, the entire edge of housing 2 can be circularly illuminated when viewing from behind the vehicle. In this composition, the emitted light can be more surely recognized even from far behind the vehicle.

The light radiating end 2c at the lower side of housing 2 may be coated with a paint. In conducting a regular coating such as spray coating, the edge portion is likely to have a reduced coat and therefore the edge portion at light radiating end 2c of housing 3 allows the light transmission through the coat.

Although in the above embodiments the vehicle side mirror apparatus is mounted on the automobile, it can be mounted on the other vehicle, such as a motorcycle, a motorcycle with sidecar and other special vehicle. The vehicle side mirror apparatus may be applied to a fender mirror of vehicle.

Further, the thickness of housing 2 may be gradually reduced from the light entering end to the light radiating end thereof. Thereby, when light emitted from the LED lamp passes through within the thickness of housing 2, part of the light leaking from the outer surface of housing 2 increases. Therefore, the visibility from ahead of the vehicle can be enhanced.

Although in the above embodiments the thickness of housing 2 is not specified, the thickness of housing 2 can be uniformly formed from the light entering end to the light radiating end thereof. Thereby, when light emitted from the LED lamp passes through within the thickness of housing 2, part of the light leaking from the outer surface of housing 2 can be reduced. As a result, light radiated from the light radiating end 2c can be intensified and therefore the visibility from behind the vehicle can be enhanced.

Further, after a luminous coat in white etc. is formed on the outer surface of housing 2 except the light radiating end 2c, on the luminous coat, a top coat may be formed that has a different color from the luminous coat by using, for example, a paint of the same color as the automobile body. Thereby, since light propagating though within the thickness of housing 2 can be sufficiently diffused, light radiated from the light radiating end 2c can be equalized. The inner cover may be omitted.

Further, a reflection layer may be formed on the inner surface of the housing 2 by aluminum deposition etc. Thereby, part of light propagated can be reflected ahead of the vehicle so as to be recognized by a person ahead of the vehicle, and the inner cover 6 can be omitted to reduce the number of components.

Although in the above embodiments the light radiating end 2c is diffusion-finished, the reflection concave portion 2e in FIG. 10 or the outer surface of housing 2 may be diffusion-finished.

In the above embodiments, the inner cover 6 colored with a paint etc. is disposed while having a predetermined clearance to the housing 2 For example, the inner cover 6 may be formed of a colorless and transparent resin material with a refractive index different from that of the housing 2 such that light can be propagated to the light radiating end 2c while being reflected by the difference in refractive index therebetween. In this composition, the inside mechanism of door mirror can be seen through and light emitted from the LED lamp 7A can be radiated behind the vehicle from the light radiating end 2c. The transparent resin material may be colored.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A vehicle side mirror apparatus for looking backward from a vehicle, comprising:
   a housing comprising a transparent or semitransparent material with a cross section having a predetermined thickness, the housing further comprising a light entering end into which light enters, and a light radiating end that faces a back of the vehicle;
   a light emitting diode lamp that is disposed to provide light to the light entering end; and
   an inner cover that is disposed inside of the housing with a predetermined clearance, the inner cover being colored such that an inside of the inner cover is opaque,
   wherein light emitted from the light emitting diode lamp enters into the light entering end of the housing, passes through the housing from the light entering end to the light radiating end by internal reflection, and radiates out of the light radiating end of the housing,
   the light emitting diode lamp comprises a planar radiation type light emitting diode lamp and comprises; a light emitting diode chip to emit light; and a transparent seal member that seals the light emitting diode chip such that light emitted from the light emitting diode chip is radiated in a plane direction perpendicular to a center axis of the light emitting diode chip, and
   the planar radiation type light emitting diode lamp is disposed such that the light radiated in the plane direction enters into the light entering end of the housing.

2. The vehicle side mirror apparatus according to claim 1, wherein:
   the light radiating end of the housing is disposed on a periphery of an opening of the housing.

3. The vehicle side mirror apparatus according to claim 1, wherein:
   the housing comprises a concave portion on a surrounding surface of which corresponds to the light entering end, and
   the planar radiation type light emitting diode lamp is disposed in the concave portion of the housing.

4. The vehicle side mirror apparatus according to claim 1, wherein:
   the housing further comprises a radiation surface through which a part of the light propagating through the housing is radiated in a front direction of the vehicle.

5. The vehicle side mirror apparatus according to claim 4, wherein:
   the radiation surface comprises a side face of a concave portion or a slit that is formed on the housing.

6. The vehicle side mirror apparatus according to claim 4, wherein:
   the radiation surface of the housing comprises a diffusion finish such that light radiated from the light radiating end is diffused.

7. The vehicle side mirror apparatus according to claim 1, wherein:
   the light radiating end of the housing comprises a diffusion finish such that light radiated from the light radiating end is diffused.

8. The vehicle side mirror apparatus according to claim 1, wherein:
   the housing further comprises a reflection layer that reflects light propagating though the housing, and that is formed on a surface thereof except the light entering end and the light radiating end.

9. The vehicle side mirror apparatus according to claim 8, wherein:
   the reflection layer comprises a luminous coat that is formed on the surface of the housing.

10. The vehicle side mirror apparatus according to claim 8, wherein:
    the reflection layer comprises a metal film that is formed by deposition on the surface of the housing.

* * * * *